United States Patent [19]

Masegi

[11] 4,350,988
[45] Sep. 21, 1982

[54] RECORDING APPARATUS FOR EFFECTING RECORDING BY A BEAM

[75] Inventor: Koichi Masegi, Yokohama, Japan

[73] Assignee: Canon Kabushiki Kaisha, Tokyo, Japan

[21] Appl. No.: 144,218

[22] Filed: Apr. 28, 1980

Related U.S. Application Data

[63] Continuation of Ser. No. 943,740, Sep. 19, 1978, abandoned.

[30] Foreign Application Priority Data

Sep. 27, 1977 [JP] Japan .................................. 52-115861

[51] Int. Cl.³ ........................................... G01D 15/14
[52] U.S. Cl. .................... 346/108; 250/236; 350/6.6; 358/285
[58] Field of Search ........................... 346/76 L, 108; 358/285–293; 350/6.7, 6.8, 6.6; 250/236

[56] References Cited

U.S. PATENT DOCUMENTS

| | | | |
|---|---|---|---|
| 3,441,949 | 4/1969 | Rolon | 346/108 |
| 3,809,806 | 5/1974 | Walker | 346/108 X |
| 3,848,087 | 11/1974 | Carrell | 346/108 X |
| 3,867,571 | 2/1975 | Starkweather | 350/285 X |
| 4,037,231 | 7/1977 | Broyles | 346/108 |
| 4,130,838 | 12/1978 | St. Joan | 350/6.7 |
| 4,140,903 | 2/1979 | Clark | 250/236 |
| 4,160,939 | 7/1979 | Damouth | 318/723 |
| 4,201,994 | 5/1980 | Hoshito | 346/108 |

*Primary Examiner*—Joseph W. Hartary
*Attorney, Agent, or Firm*—Fitzpatrick, Cella, Harper & Scinto

[57] ABSTRACT

In order to effect recording on a recording medium by projecting a beam on the recording medium, the beam must be deflected at a predetermined velocity. To deflect the beam at a predetermined velocity, the present invention detects the deflected beams by a beam detector to form a velocity signal and compares the velocity signal with a reference signal to control the motor of the deflector by the comparison output.

20 Claims, 9 Drawing Figures

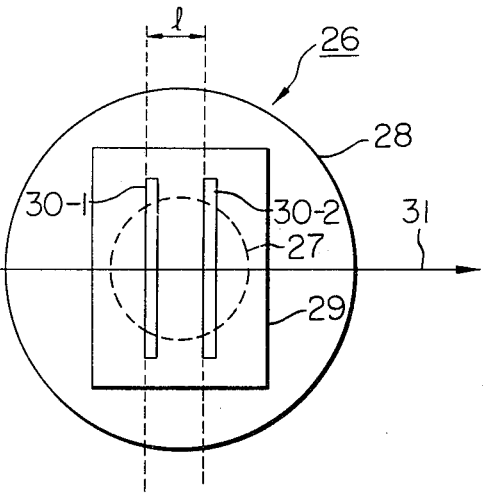
FIG. 3A
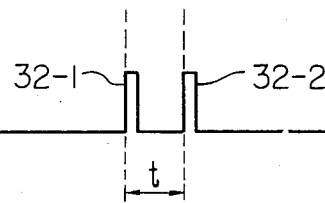
FIG. 3B
FIG. 3C
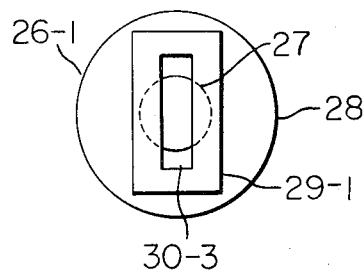
FIG. 6
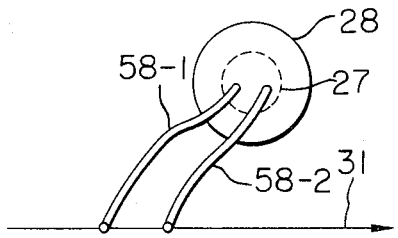

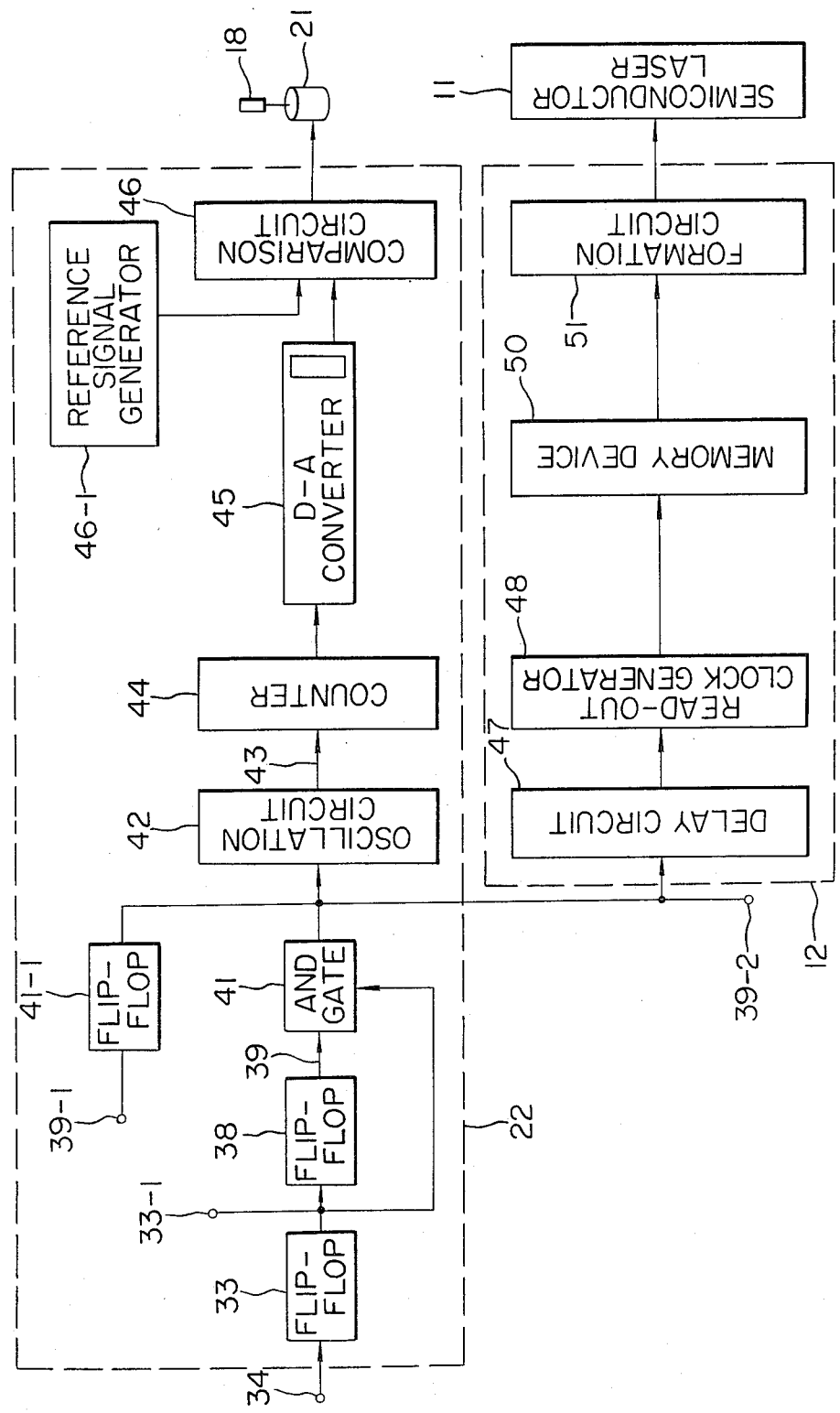

RECORDING APPARATUS FOR EFFECTING RECORDING BY A BEAM

This is a continuation of application Ser. No. 943,740, filed Sept. 19, 1978, now abandoned.

BACKGROUND OF THE INVENTION

1. Field of the Invention

This invention relates to a recording apparatus for recording information on a recording medium by the use of a beam, and more particularly to a recording apparatus in which the scanning velocity of the beam scanning over the recording medium is controlled.

2. Description of the Prior Art

In the prior art recording apparatus for recording information by projecting a light beam on a recording medium, a rotatable polygon mirror rotatable in one direction or a mirror vibrating within a predetermined angle has been often used as the deflector for deflecting the light beam.

In such a recording apparatus, a velocity detector has been provided within the motor for driving the rotatable polygon mirror or the reciprocally rotatable motor for driving the mirror to render the deflection velocity of the light beam constant, and the driving of the deflector has been controlled by the output of the velocity detector.

However, to enhance the control accuracy in such a velocity control, it has been necessary to increase the number of the velocity detectors to be contained within the motor, to enhance the accuracy with which these velocity detectors are arranged, or to reduce the irregularity of the sensitivity of the detector and this has involved technical difficulties and has become expensive.

SUMMARY OF THE INVENTION

It is an object of the present invention to provide a recording apparatus for effecting recording by a beam in which the scanning velocity of the beam can be controlled by a simple construction.

It is another object of the present invention to provide a recording apparatus for effecting recording by a beam in which the scanning velocity of the beam can be controlled with a high accuracy.

It is still another object of the present invention to provide a recording apparatus for effecting recording by a beam in which a beam detector used to detect the position of the beam during the recording on a recording medium by the beam is also used as a detector for detecting the scanning velocity of the beam, thereby controlling the scanning velocity of the beam by a simple construction.

Other objects of the present invention will become apparent from the following detailed description thereof taken in conjunction with the accompanying drawings.

BRIEF DESCRIPTION OF THE DRAWINGS

FIG. 3A is a front view showing a photodetector device.

FIG. 3B illustrates the pulse signal waveform provided by the photodetector device.

FIG. 3C is a front view showing a photodetector device according to another embodiment.

FIG. 4 is a block diagram showing the control circuit of the recording apparatus.

FIG. 6 is a perspective view showing a photodetector device according to a further embodiment.

DESCRIPTION OF THE PREFERRED EMBODIMENTS

Figure 1:
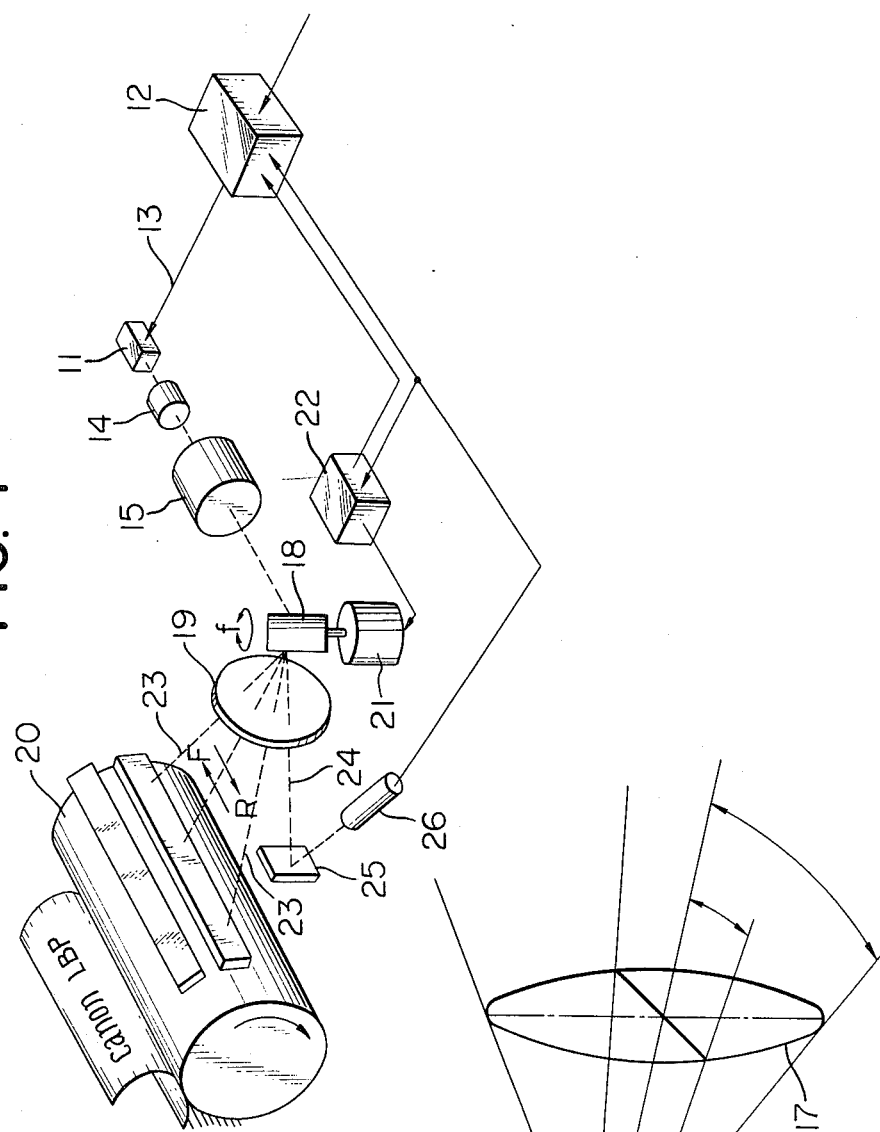
FIG. 1 is a perspective view showing the recording apparatus according to the present invention.

The invention will hereinafter be described with respect to a semiconductor laser recording apparatus using an electrophotographic recording material. FIG. 1 is a schematic representation of the laser recording apparatus according to an embodiment of the present invention. A semiconductor laser generator 11 generates a modulated laser beam by a modulation signal applied thereto from a modulation signal forming device 12 through a signal line 13, and this laser beam is collimated by an objective lens 14 and enters a cylindrical lens 15.

Figure 2:
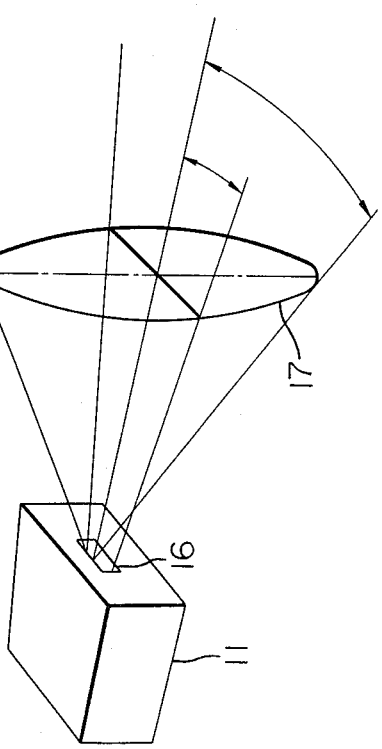
FIG. 2 is a perspective view showing a semiconductor laser.

The semiconductor laser generator 11 has its light emitting surface 16 asymmetric as shown in FIG. 2, so that the emitted pattern becomes asymmetric and the pattern of the laser beam having passed through the objective lens also becomes asymmetric. To correct this and create a symmetric beam pattern, the aforementioned cylindrical lens 15 is used.

The light passed through the cylindrical lens 15 becomes a symmetric pattern and that light beam is reflected by a mirror 18 reciprocated within a predetermined angle as indicated by arrow f, and passed through a focusing lens 19 and focused on a photosensitive drum 20. A motor 21 for driving the mirror 18 is driven from a driving circuit 22 so as to be harmonically oscillated within a predetermined angle, as disclosed, for example, in Japanese Patent Publication No. 16290/1970 or U.S. Pat. No. 3,624,574.

Therefore, in accordance with the operation of the mirror 18, the aforementioned beam scans over the drum 20 in the directions of arrows F and R. The focusing lens 19 is designed such that the light beam scans over the drum 20 at a uniform speed with respect to the harmonic oscillation of the motor 21 and that the scanning light is focused on the drum. In a conventional lens, the position of the image y for the angle of incidence $\theta$ is $y = f \tan \theta$, whereas in the focusing lens 19 of the present apparatus, $y = f\theta \cdot \sin^{-1}(\theta/\theta°)$, where f is the focal length, $\theta°$ is the angle of rotation of the mirror, y is the position of the image and $\theta$ is the angle of incidence on the focusing lens. The motor 21 and mirror 18 effect harmonic oscillation $\theta = \theta° \cdot \sin \omega t$, the position of the image becomes $$y = f\theta° \cdot \sin^{-1}\left(\frac{\theta}{\theta°}\right) = f\theta \cdot \sin^{-1}\left(\frac{\theta° \sin \omega t}{\theta°}\right) = f\theta° \cdot \omega t,$$

and the scanning speed becomes $(dy/dt) = f\theta°\omega$, which is constant. The use of such a focusing lens 19 enables uniform velocity scanning.

When the laser beam 23 scanning over the drum 20 has come to the position of a laser beam 24 (this laser beam 24 is one for irradiating the non-recording area of the photosensitive drum 20), it reaches a photodetector device 26 through a mirror 25 and the photodetector device generates an output signal. This photodetector device 26 will now be described in detail by reference to FIG. 3. The photodetector device 26 comprises a photodetector 28 having a detecting area 27, and a slit plate 29 disposed in front of the detecting area 27. The slit plate 29 is provided with parallel slits 30-1 and 30-2. Therefore, if the light beam 24 moves over the scanning line 31 in the direction of arrow, two pulse signals 32-1 and 32-2 as shown in FIG. 3B are provided by the photodetector 28, If the pulse interval is t, and if the interval between the double slit is l, then the scanning velocity V may be obtained by $V=(l/t)$. Consequently, by accurately controlling the interval t so that it is always constant, the scanning velocity can be maintained constant.

FIG. 4 shows in further detail a portion of the driving circuit and the modulation signal forming circuit 12 shown in FIG. 1. If the pulse signal from the aforementioned photodetector device is applied to the terminal 34 of a flip-flop 33, four pulse signals are generated during one scanning period of the light beam in the recording apparatus shown in FIG. 1.

More particularly, by the light beam crossing the slits when it moves in the direction of arrow R in FIG. 1, there are provided pulse signals 35-1 and 35-2 shown in FIG. 5A, and by such light beam again crossing the slits after it has changed its scanning direction to the direction of arrow F at the time $t_1$, there are provided pulse signals 32-1 and 32-2 as already noted.

In the recording apparatus shown in FIG. 1, the laser beam 23 is deflected in the direction of arrow F or R, and recording on the photosensitive drum 20 takes place only when the laser beam 23 moves in the direction of arrow F and recording on the photosensitive drum 20 does not take place when the laser beam 23 moves in the direction of arrow R.

Thus, signals 36 and 37 as shown in FIG. 5B are provided from a flip-flop 33, and by such signals being further applied to a flip-flop 38, a signal 40 as shown in FIG. 5C is provided on a signal line 39. By these signals 36, 37 and 40 being applied to an AND gate 41, only a selected signal 37 can be provided from the AND gate 41, as shown in FIG. 5D.

Designated by 42 is an oscillation circuit which oscillates at a predetermined frequency f. Such oscillation circuit is designed so that it oscillates only during the high level of the input, and there is provided on an output signal line 43 an oscillation output as shown in FIG. 5E.

Such oscillation output is further applied to a counter 44 which counts the pulse number derived from the oscillation. Such count is varied by the width of the signal 37 (in other words, the interval between the pulse signals 32-1 and 32-2), and thus the count indicates the velocity of the light beam.

The output of the counter 44 is further applied to a digital-analog converter 45 and thereby converted into an analog value corresponding to the digital value and such analog value is held, until the next count output is derived from the counter 44, by a hold circuit 45-1 includes in the converter circuit.

The analog value so held is further applied to a comparison circuit 46 by which it is compared with a signal of a predetermined level generated by a reference signal generator 46-1 to form a velocity control signal.

Therefore, by such control signal being applied to the motor 21, the motor 21 may be driven at a predetermined constant speed to thereby render the scanning velocity of the light beam to a predetermined velocity.

If the scanning velocity of the beam is lower than a predetermined velocity, the interval between the pulse signals 32-1 and 32-2 is widened to increase the count by the counter 44. Therefore, when the level of the analog signal provided by the D-A converter 45 is compared with the reference signal provided by the reference signal generator 46-1, the analog signal is greater than the reference signal so that a control signal which will increase the speed of the motor 21 is derived from the comparison circuit 46. Conversely, if the scanning velocity of the beam is higher than the predetermined velocity, the interval between the pulse signals 32-1 and 32-2 is narrowed to decrease the count by the counter 44. Therefore, when the level of the analog signal provided by the D-A converter 45 is compared with the level of the reference signal provided by the reference signal generator 46-1, the analog signal is smaller than the reference signal so that a control signal which will decrease the speed of the motor 21 is derived from the comparator circuit 46.

As described above, the scanning velocity of the light beam can be controlled by a pulse signal obtained from the photodetector device and in the present embodiment, such a pulse signal is used as a synchronizing signal for designating the start position of information recording on the drum 20.

More particularly, the aforementioned signal 37 is applied to a delay circuit 47 having a delay time T and thereby rendered to a signal 37' as shown in FIG. 5F, and such signal 37' drives a read-out clock generator 48 which generates a read-out clock signal of a predetermined frequency.

Thus, as shown in FIG. 5G, a clock signal 49 is generated. Such clock signal is applied as a read-out clock to a memory device which stores therein recording information to modulate the light beam, so that the read-out of the recording information is started at time $t_2$.

The recording information so read-out is converted into a signal suited to be applied to the semiconductor laser 11 by a formation circuit 51, whereafter it is applied to the semiconductor laser 11.

The detailed construction of the circuit elements 47, 48, 50 and 51 is fully disclosed in U.S. Pat. No. 4,059,833 and the detailed description thereof is omitted herein for simplicity.

Figure 5:
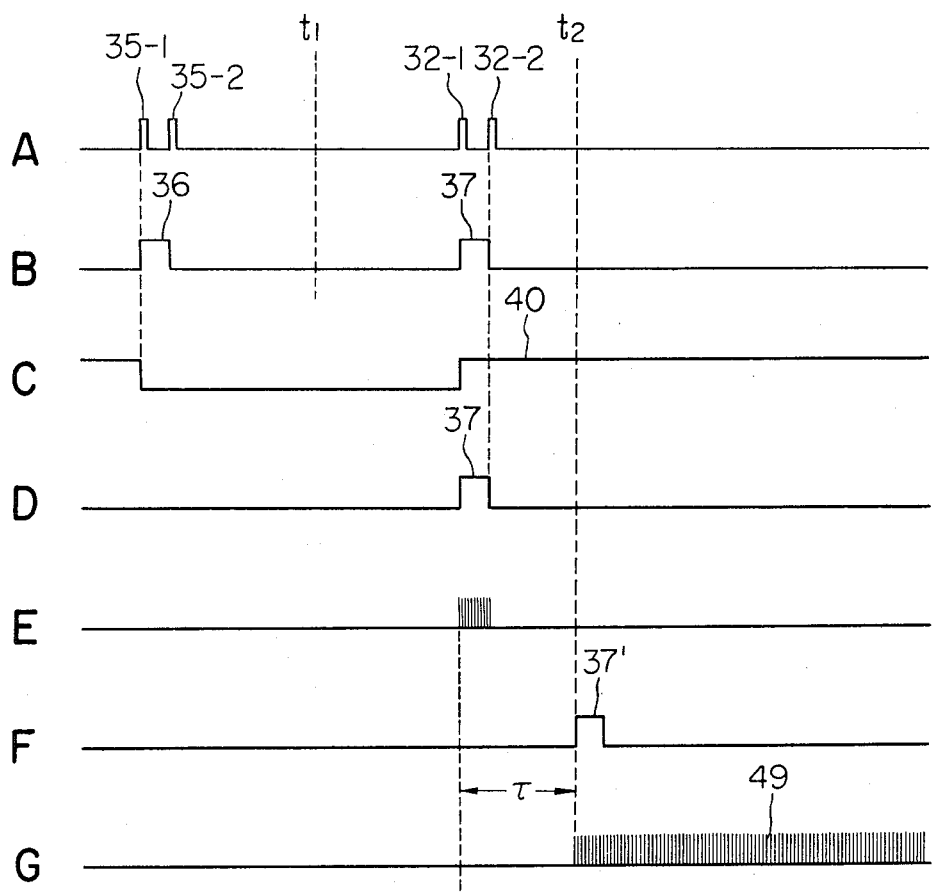
FIG. 5 shows signal waveforms provided at various parts of FIG. 4.

When a motor continuously rotating in one direction at a predetermined speed as shown, for example, in said U.S. Pat. No. 4,059,833 is used as the motor 21 and a rotatable polygon mirror comprising a regular polygonal reflecting member as shown in said U.S. Pat. No. 4,059,833 is used as the mirror 18, the laser beam is only scanned in the direction of arrow F. Therefore, only the pulse signals 32-1 and 32-2 in FIG. 5 are derived from the photodetector device 26 and so, in such a case, the output of the photodetector 26 is applied to a terminal 39-1 and thereby to a flip-flop 41-1, and the output of this flip-flop 41 may be applied to said oscillator 42 and said delay circuit 47.

Where, instead of the photodetector device 26, a photodetector device 26-1 having a slit plate 29-1 having a single opening 30-3, as shown in FIG. 3C, is used in the recording apparatus using a reciprocally rotatable motor 21 as shown in FIG. 1, the output of the photodetector 26-1 is as shown in FIG. 5B and the output of the photodetector device 26-1 may be applied to a terminal 33-1 in FIG. 4.

When the photodetector device 26-1 shown in FIG. 3C is used instead of the photodetector 26 shown in FIG. 1, a motor continuously rotating in one direction at a predetermined speed is used as the motor 21, and a rotatable polygon mirror comprising a regular polygonal reflecting member is used as the mirror 18, then the output of the photodetector device 26-1 is as shown in FIG. 5D and such output may be applied to a terminal 39-2 in FIG. 4.

FIG. 6 shows another embodiment of the photodetector device shown in FIG. 3. In this alternative embodiment, the slit plate 29 in FIG. 3A is replaced by glass fibers 58-1 and 58-2. The elements similar to those in FIG. 3 are given similar reference characters.

Again in such photodetector device, two pulse signals can be provided just in the same manner as described in connection with FIG. 3A.

Figure 7:
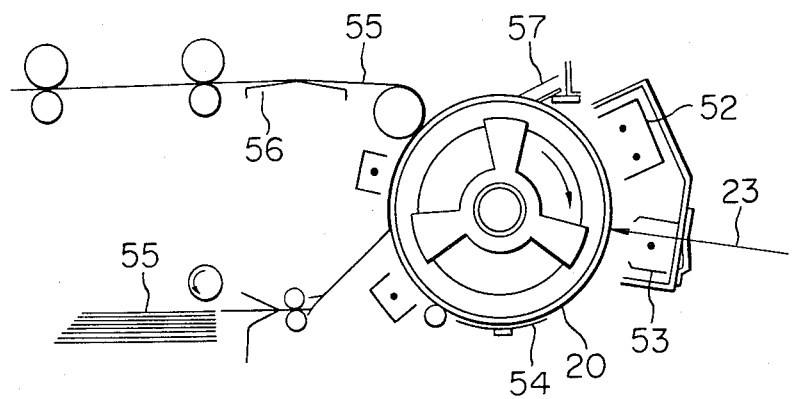
FIG. 7 is a side view showing the parts around the drum.

Reference is now had to FIG. 7 to describe the recording of information on the drum 20.

As an example of the electrophotographic process applicable to the present embodiment, there is a method as disclosed in U.S. Pat. No. 3,666,363 which comprises uniformly pre-charging to the positive or the negative polarity the insulating layer surface of the photosensitive drum 20 basically comprising an electrically conductive back-up member, a photocoductive layer and an insulating layer, by the use of a first corona charger 52, thereby causing charge opposite in polarity to the said charge to be trapped in the interface between the photoconductive layer and the insulating layer or in the interior of the photoconductive layer, applying said laser beam 23 to the charged insulating layer surface and simultaneously therewith, applying AC corona discharge from an AC corona discharge 53 to the insulating layer surface, to thereby form a pattern on the insulating layer surface as a result of the surface potential difference created in accordance with the light-and-dark pattern of the laser beam 23, uniformly exposing the entire surface of the insulating layer to light to thereby form an electrostatic image of high contrast on the insulating layer surface, developing the electrostatic image into a visible image in a developing device 54 by the use of a developer chiefly composed of charged toner particles, thereafter transferring the visible image onto a transfer medium 55 by the utilization of an internal or an external field, fixing the transferred image by a fixing device 56 comprising an infrared ray lamp or a hot plate, thereby providing an electrophotographically printed image, while, on the other hand, cleaning the insulating layer surface by a cleaning device 57 after the image transfer to remove the remaining charged particles therefrom and thus rendering the photosensitive drum 20 ready for reuse.

In the recording apparatus according to the present invention, as has hitherto been described, a velocity signal is formed by the output of the photodetector device provided at the scanning position of the light beam and so, the light beam can be controlled so as to scan at a predetermined velocity by a very simple construction. Further, a synchronizing signal can also be formed at the same time by such a photodetector device. Still further, velocity detection and velocity control at a high accuracy can be effected by increasing the distance between the deflector and the beam detector.

What I claim:

1. A recording apparatus for effecting recording by a beam, comprising:
   beam formation means for forming a beam modulated by a modulation signal;
   deflector means having a deflecting member for deflecting the beam;
   a recording medium located within the deflection range of said deflector means and adapted to be irradiated with the beam when deflected in one direction and on which the irradiation track of the beam is recorded;
   beam detecting means provided within the deflection range of said deflector means but outside the area defined by said recording medium, said detecting means being upstream of said recording medium with respect to said one direction of deflection, said deflector means deflecting the beam to scan first said beam detecting means and then said recording medium during one scanning stroke;
   velocity signal formation means for forming, in response to the beam, deflected by said deflecting member sweeping said beam detecting means, a signal representing the velocity of the beam; and
   control means for controlling, in accordance with the signal formed by said velocity signal formation means during one scanning stroke, the velocity of the beam when scanning said recording medium during the same scanning stroke.

2. A recording apparatus according to claim 1, wherein said beam formation means has a semiconductor laser oscillator.

3. A recording apparatus according to claim 1, wherein said deflector means comprises a motor reciprocally rotatable within a predetermined angle and a light reflecting member fixed to said motor.

4. A recording apparatus according to claim 1, wherein said deflector means comprises a motor continuously rotatable in one direction and a polygonal reflecting member fixed to said motor.

5. A recording apparatus according to any one of claims 1, 2, 3 and 4, wherein said recording member comprises a photosensitive drum.

6. A recording apparatus for effecting recording by a beam, comprising:
   beam formation means for forming a beam modulated by a modulation signal;
   deflector means having a deflecting member for deflecting the beam;
   a recording medium adapted to be irradiated with the deflected beam and on which the irradiation track of the beam is recorded;
   beam detecting means provided in a portion of the area scanned by the deflected beam but outside the recording area and on one side thereof, said detecting means having a plurality of detecting portions, said deflector means deflecting the beam to scan first said beam detecting means and then said recording medium during one scanning stroke;
   velocity signal formation means for forming in response to the beam deflected by said deflecting member sweeping said plurality of detecting portions, a signal representing the velocity of the beam; and
   control means for controlling, in accordance with the signal formed by said velocity signal formation means during one scanning stroke, the velocity of the beam when scanning said recording medium during the same scanning stroke.

7. A recording apparatus according to claim 6, wherein said beam detecting means comprises a lightintercepting member having two slits and a light receiving portion provided in common with said two slits.

8. A recording apparatus according to claim 6, wherein said beam detecting means comprises two light guide transparent members and a converting member for converting into electrical signals the light guided by said light guide transparent member.

9. A recording apparatus according to claim 6, 7 or 8, wherein said velocity signal formation means has a oscillation circuit for oscillating a signal of a predetermined frequency and a counter for counting the signal oscillated by said oscillation circuit during the time when said beam passes through said two light detecting portions.

10. A recording apparatus according to claim 6, wherein said velocity signal formation means has a means for forming a time signal which is at a certain level during the time when said beam passes through said two detecting portions and which is at another level during the remaining time.

11. A recording apparatus according to claim 10, wherein said velocity signal formation means has oscillation means for oscillating a signal of a predetermined frequency and a counter for counting said signal.

12. A recording apparatus for effecting recording by a beam, comprising:
beam generating means for generating a beam;
deflector means for repetitively deflecting said beam in one direction and in the direction opposite to said one direction;
a beam projecting member for projecting the deflected beam;
beam detecting means provided in a portion of the area scanned by the deflected beam for detecting the arrival of said beam and for forming a detection signal;
selector means for selecting the detection signal provided when said beam is deflected in said one direction from among a plurality of detection signals provided by said beam detecting means in response to the beam being deflected in said one direction and in said opposite direction;
velocity signal formation means for forming a velocity signal representing the scanning velocity of said beam from the detection signal obtained by said selector means; and
control means for controlling the deflection velocity of said beam by said deflector means in accordance with the velocity signal provided by said velocity signal formation means.

13. A recording apparatus according to claim 12, wherein said selector means has a flip-flop to which said detection signal is applied, and a logic circuit to which the output of said flip-flop and said detection signal are applied.

14. A recording apparatus according to claim 12, wherein said beam detecting means has two beam detecting portions offset in the scanning direction of the beam, and detection signal formation means for forming a detection signal from two pulse signals provided when the beam passes through respective ones of said two detecting portions.

15. A recording apparatus according to claim 12, wherein said velocity signal formation means has oscillation means for oscillating a signal of a predetermined frequency and a counter for counting said signal in response to said detection signal.

16. A recording apparatus for effecting recording by a beam, comprising:
beam formation means for forming a beam modulated by a modulation signal;
deflector means having a deflector for deflecting the beam;
a recording medium located within a deflection range of said deflection means and adapted to be irradiated with the deflected beam and on which the irradiation track of the beam is recorded;
beam detecting means provided within the deflection range of said deflector means and upstream of the area defined by said recording medium with respect to the direction of deflection;
clock signal generating means for generating clock signals having a predetermined frequency;
counting means for counting, in response to the detection of the beam by said detecting means, said clock signals;
control signal forming means for forming a velocity control signal in response to the count of said counting means; and
control means for controlling, in accordance with the signal formed by said control signal forming means during one scanning stroke, the velocity of the beam when scanning said recording medium during the same scanning stroke.

17. A recording apparatus according to claim 16, wherein said beam formation means has a semiconductor laser oscillator.

18. A recording apparatus according to claim 16, wherein said deflector means comprises a motor reciprocally rotatable within a predetermined angle and a light reflecting member fixed to said motor.

19. A recording apparatus according to claim 16, wherein said deflector means comprises a motor continuously rotatable in one direction and a polygonal reflecting member fixed to said motor.

20. A recording apparatus according to claim 16, 17 18 or 19, wherein said recording member comprises a photosensitive drum.

* * * * *